H. M. LOFTON.
FIRE HYDRANT.
APPLICATION FILED MAR. 8, 1916. RENEWED FEB. 7, 1918.
1,278,487.
Patented Sept. 10, 1918.
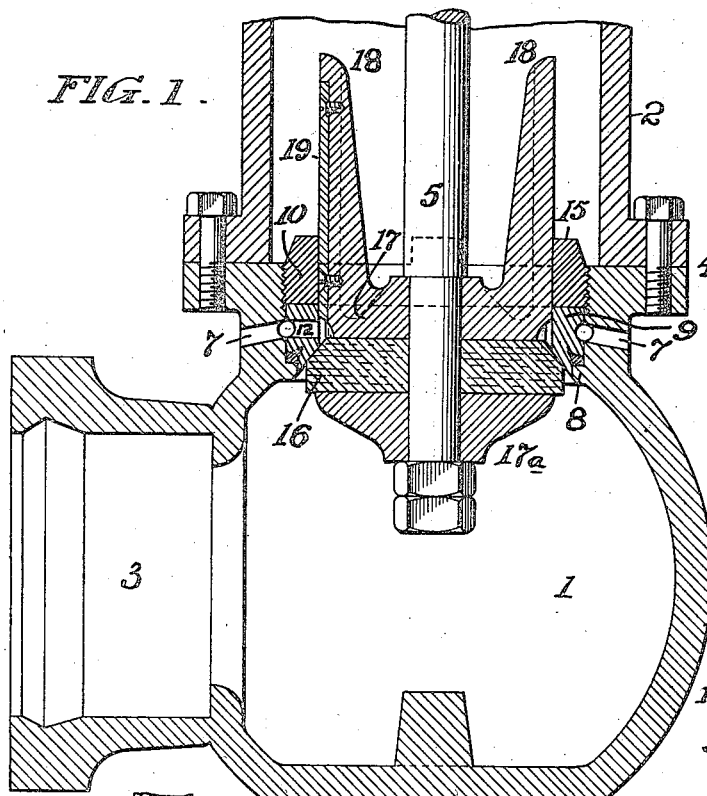
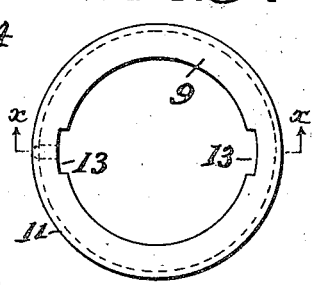
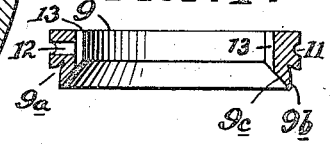
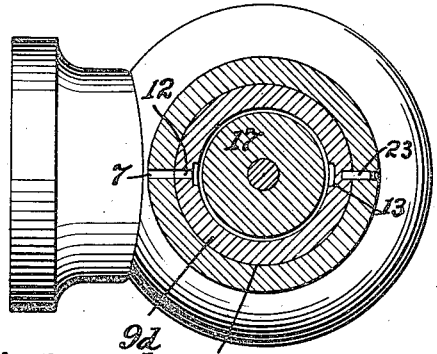
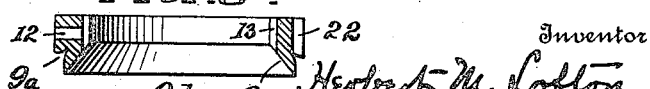
Inventor
Herbert M. Lofton
Witnesses
Daniel Webster Jr.
E. W. Smith
By
Attorney

UNITED STATES PATENT OFFICE.

HERBERT M. LOFTON, OF CHATTANOOGA, TENNESSEE.

FIRE-HYDRANT.

1,278,487.　　　　Specification of Letters Patent.　Patented Sept. 10, 1918.

Original application filed August 24, 1910, Serial No. 578,774. Patent No. 1,178,588, April 11, 1916. Divided and this application filed March 8, 1916, Serial No. 82,799. Renewed February 7, 1918. Serial No. 215,922.

*To all whom it may concern:*

Be it known that I, HERBERT M. LOFTON, a citizen of the United States, and resident of Chattanooga, county of Hamilton, and State of Tennessee, have invented an Improvement in Fire-Hydrants, of which the following is a specification.

The object of my invention is to provide a construction of fire hydrant in which the valve seat and valve may be withdrawn from the stock and shoe for repairs, and in doing so withdraw with them the packing gasket employed for making a tight joint between the valve seat and hydrant shoe and stock which remains intact.

This application is a division of my application Serial Number 578,774 and filed August 24, 1910, and is especially directed to the particular improvement of the packing gasket and its relation to the associated parts of the hydrant; and any details herein shown and not forming subject matter of the claims are a part of my aforesaid application and claimed therein.

Heretofore, in fire hydrants it has been customary to secure the valve seat in the stock or shoe with a tight joint by providing an annular flat gasket clamped between the opposing horizontal annular surfaces. When the valve and valve seat were required to be withdrawn from the shoe and stock, the gasket invariably remained in position in the shoe and so far down in the stock that it was difficult to remove it, and the loss of the mechanic's time in so doing made the repair expense very costly. By the employment of my invention, this difficultly is entirely overcome, as once the gasket has been applied it remains attached to the valve seat and is withdrawn with it when the latter is pulled up through the stock by the valve stem. Moreover, the act of screwing the valve seat in place in the shoe automatically attaches the gasket to the valve seat and not to the shoe, and this is an especial feature of my invention.

With the above and other objects in view, the nature of which will be more fully understood from the description hereinafter, the invention consists of a shoe having an annular shouldered portion for receiving a soft metal gasket and provided above it with a screw threaded aperture into which the annular ring piece of the valve seat structure may be screwed when clamping the valve seat in position upon the gasket, the valve seat ring having its lower perimeter provided with an annular shouldered portion to receive the gasket and so shaped as to provide an undercut construction into which the gasket is pressed during the forcing down of the valve seat, so that the gasket becomes an attached part of the valve seat and removable with it when withdrawn from the shoe and stock; and further, in details of construction as more fully described hereinafter and defined in the claims.

Referring to the drawings:—Figure 1 is a sectional view through the lower portion of a fire hydrant and embodying my invention; Fig. 2 is an enlarged view of a portion of the same with the parts in position just before forcing the valve seat in position upon the gasket; Fig. 3 is a plan view of the valve seat ring; Fig. 4 is a cross section of the same on line $x$—$x$; Fig. 5 is a transverse section of a modified form of the hydrant adapted for use with my invention; and Fig. 6 is a cross section of the valve seat ring shown in Fig. 5.

The shoe is indicated at 1 and has the side inlet 3, and at the top is provided with a cylindrical bore 20 having at its bottom an inwardly directed flange 8 forming an annular horizontal seat for the gasket 21. The bore 20 is provided at its upper portion with screw threads as shown, and its lower portion may be made smooth and if desired provided with an annular groove 6 for drainage purposes. The stock 2 may be bolted to the shoe as indicated at 4, but I do not restrict myself to these details.

Fitting down into the smooth portion of the bore 20 of the shoe is the annular valve seat ring 9 having on its under and inner surface the conical valve seat $9^c$, and on its under and outer portion the annular groove $9^a$ of peculiar shape into which the lead gasket 21 is forced. By reference to the drawings, it will be seen that this annular groove is formed by two curved portions forming an annular undercut recess whose inner diameter is less than the diameter of the downwardly extending flange $9^b$. It will also be seen that these curved surfaces act as cam surfaces in shaping the lead gasket when the seat ring 9 is forced down so that it spreads inwardly into and fills the undercut groove as shown in Fig. 1.

The seat ring 9 does not rotate and therefore does not injure the gasket, its movement being rectilinear and produced by the rotation of the annular clamping bushing 10 which is screwed into the threaded portion of the aperture 20 of the shoe. This clamping bushing 10 may have lugs 15 on its upper surface by which it may be rotated through the use of a suitably shaped wrench. When this bushing 10 is screwed down upon the seat ring, the latter is pushed down from position shown in Fig. 2 into the position shown in Fig. 1. During this operation, the gasket, of rectangular cross section, is so clamped and compressed that it completely changes its shape and becomes attached to the seat ring 9, and thereafter may be redrawn and reinserted with said seat ring.

The seat ring 9 may have the following additional features: It may be provided with an annular peripheral groove 11 which comes into alinement with the groove 6 of the shoe to provide a large drainage channel; it may also have a transverse drainage aperture 12 through which the hydrant stock may drain when the hydrant has been closed, the drainage from the aperture 12 passing into the annular channel and thence through the radial apertures 7 to the ground outside of the hydrant; it may further have oppositely arranged vertical grooves 13 (through one of which the aperture 12 opens), said grooves acting as guides for the drainage valve 19 and wings 18.

The main valve 16 is secured upon the bottom of the valve rod 5 and also coöperates with the valve seat of ring 9. It may consist of the conical leather portion 16 clamped between the upper disk 17 and lower disk 17ª. The disk 17 is provided with the upwardly extending guide wings 18 which are guided in the grooves 13 of the seat ring 9 aforesaid, and prevent the valve from rotating when the usual operating nut (not shown) is rotated in opening or closing the hydrant. One of these wings may have the leather valve strip 19 as shown so as to act as a drainage valve for the aperture or part 12 to drain the water from the stock when the main valve is closed, as shown in Fig. 1.

In the modification shown in Figs. 5 and 6, the seat ring has the annular groove 11 omitted, and in place the seat ring 9ᵈ has a vertical groove 22 which receives a transverse pin 23 in the shoe, and which construction permits the ring to move vertically into position but prevents it from rotating. Furthermore, the pin and groove insure the ring going into the shoe in a definite position, and so that the drainage aperture 12 comes exactly in alinement with the aperture 7. In this construction as shown in Fig. 5, not only is the annular groove 11 of the seat ring omitted, but the annular groove 6 of the shoe is also omitted, these details not being essential to my improvement. This construction is somewhat less expensive than the construction shown in Figs. 1 to 4, but it has the disadvantage that there is more liability for the drainage apertures to become clogged owing to the fact that there is only one outlet. These details, however, may be varied as desired.

It will now be understood that when the bushing 10 is screwed down tightly upon the seat ring the latter is guided in the shoe and forcibly pressed upon the gasket 21 without rotating it. The cam action of the groove 9ª is such that its upper curved surface presses upon the upper surface of the gasket adjacent to its outer edge, and tends to force the lead body thereof adjacent to the inner edge both upwardly and inwardly, this action being permitted by the fact that the circumferentially curved portion has a smaller diameter at the top than at the lower part, thereby providing more room for the inner portion of the gasket, and the latter is therefore spread inwardly as the seat ring is pressed downwardly upon it and automatically shapes itself to the undercut groove 9ª thereof, as is clearly shown in Fig. 1. The gasket then becomes an attached part of the seat ring structure, and may be withdrawn or inserted with the seat ring in subsequent withdrawal thereof in the matter of repairs to the hydrant. In withdrawing the seat ring with its attached gasket, the bushing 10 is first unscrewed and then the valve rod is pulled upwardly and with it the valve seat ring and the bushing, and in this action the gasket is carried upwardly with the seat ring as the attachment is so firm that it can overcome any friction with the shoe without disengaging itself from the seat ring. I do not restrict myself to the particular shape of the undercut portion of the seat ring, nor to the particular composition of the soft gasket, as these may be varied so long as the general embodiment of the invention is maintained. It will also be observed that the downwardly extending flanged portion 9ᵇ of the seat ring fits through the inner opening of the flanged portion 8 of the shoe so that the gasket is confined within an annular channel, and because of this inability to escape by flowing out of this annular channel, the metal of the gasket is compelled to flow in the direction of the undercut portion of the groove of the seat ring. While I have shown my invention in connection with a seat ring formed in the two parts 9 and 10, the latter screwed into the shoe to clamp the seat ring in place, these specific details do not enter into the invention as it is manifest that the two parts 9 and 10 may be integral if so desired as disclosed in Letters Patent No. 1ˢᵗ

978,385, dated December 13, 1910, formerly granted to me, and so far as the invention claimed is concerned, the seat ring may be an annular part upon which the main valve seats and which is detachably attached to the shoe, so long as it provides the specific construction of annular groove on its outer lower portion having the undercut parts into which the soft metal gasket is tightly fitted whereby said gasket is held both against being blown out laterally or pulled out downwardly, the former in the natural use of the organized hydrant and the latter when withdrawing the seat ring with the valve.

It will now be apparent that I have devised a novel and useful construction which embodies the features of advantage enumerated as desirable, and while I have in the present instance shown and described a suitable embodiment thereof which has been found in practice to give satisfactory and reliable results, it is to be understood that I do not restrict myself to the details, as the same are susceptible of modification in various particulars without departing from the spirit of the invention.

Having now described my invention, what I claim as new and desire to secure by Letters Patent, is:—

1. In a fire hydrant, a shoe having at its upper portion a cylindrical aperture provided with an annular inwardly directed shoulder at the bottom, combined with a valve seat ring fitting the cylindrical aperture and having an internal aperture of less diameter than the diameter of the opening of the flange of the shoe, and said seat ring having a downwardly extending flange portion providing a conical valve seat and fitting into the aperture of the flange of the shoe, said seat ring flange being also undercut so as to have a smaller circumferential diameter at its upper part than at its lower part, a soft metal gasket clamped between the seat ring and the flange of the shoe and fitting the undercut portion of the seat ring flange whereby it is removable with the seat ring, a valve piece of greater diameter than the internal diameter of the seat ring, and a valve spindle secured to the valve piece whereby when the spindle and valve piece are lifted they will carry with them the seat ring and the gasket.

2. In a fire hydrant, the shoe having a cylindrical aperture at the top said aperture formed with an inwardly directed flange at its lower part, combined with a valve seat ring fitting the aperture of the shoe and having its inner lower portion formed with a conical seat and its outer lower portion formed with an annular groove having its inner corner formed as an undercut recess and said ring adapted to extend through the opening within the flanged portion of the shoe to provide an annular chamber, and a gasket resting upon the annular flange of the shoe and fitting tightly into the grooved undercut portion of the seat ring whereby the gasket forms a water tight joint between the seat ring and the shoe and is attached to the seat ring so as to be positively removable therewith.

3. A seat ring for a fire hydrant, consisting of a ring-shaped structure having its lower inner portion formed with a conical seat and its lower outer portion formed with an annular groove the walls of which are at an angle to each other and said walls having annular depressed portions at a distance from their outer edges.

4. A seat ring for a fire hydrant, consisting of a ring-shaped structure having its lower inner portion formed with a conical seat and its lower outer portion formed with an annular groove the two walls of which are at an angle to each other and are annularly recessed to provide undercut portions common to both walls, and said ring provided with an annular soft metal gasket rigidly positioned in the groove and tightly fitting the undercut portions thereof and having a vertical depth less than the vertical depth of the grooved portion of the seat ring.

5. A seat ring for a fire hydrant, consisting of a ring-shaped structure having its lower inner portion formed with a valve seat and its outer lower portion formed with an annular groove, the upper annular horizontal wall of the groove having an undercut portion at a distance from the outer circumferential edge of the wall, and an annular soft metal gasket rigidly fitted in the groove and extending up into the undercut portion to hold it in place.

In testimony of which invention, I hereunto set my hand.

HERBERT M. LOFTON.

Witnesses:
K. L. MCCARTHY,
T. P. DICKMANN.